US009203725B2

(12) United States Patent
Ronchetti et al.

(10) Patent No.: US 9,203,725 B2
(45) Date of Patent: Dec. 1, 2015

(54) UPDATE OF A CUMULATIVE RESIDENCE TIME OF A PACKET IN A PACKET-SWITCHED COMMUNICATION NETWORK

(75) Inventors: Luigi Ronchetti, Como (IT); Riccardo Gemelli, Settimo Milanese (IT); Giorgio Cazzaniga, Monte Marenzo (IT); Carlo Costantini, Casatenovo (IT)

(73) Assignee: Alcatel Lucent, Boulogne-Billancourt (FR)

( * ) Notice: Subject to any disclaimer, the term of this patent is extended or adjusted under 35 U.S.C. 154(b) by 125 days.

(21) Appl. No.: 13/637,887
(22) PCT Filed: Apr. 14, 2011
(86) PCT No.: PCT/EP2011/055904
§ 371 (c)(1),
(2), (4) Date: Sep. 27, 2012
(87) PCT Pub. No.: WO2011/131556
PCT Pub. Date: Oct. 27, 2011

(65) Prior Publication Data
US 2013/0028265 A1    Jan. 31, 2013

(30) Foreign Application Priority Data
Apr. 23, 2010    (EP) .................................... 10305432

(51) Int. Cl.
*H04L 12/50* (2006.01)
*H04L 12/26* (2006.01)
*H04J 3/06* (2006.01)
(52) U.S. Cl.
CPC ............. *H04L 43/106* (2013.01); *H04J 3/0697* (2013.01); *H04L 43/0858* (2013.01); *H04J 3/0682* (2013.01)
(58) Field of Classification Search
CPC . H04L 12/5601; H04L 12/64; H04L 12/6402; H04L 43/106; H04L 2012/2845; H04L 43/0852; H04L 47/10; H04L 47/283; H04L 47/30; H04L 49/90; H04L 47/25; H04J 3/0632; H04B 1/7117; H03L 7/07
USPC .................................................. 370/357–396
See application file for complete search history.

(56) References Cited

U.S. PATENT DOCUMENTS

| 5,793,976 | A  | * | 8/1998  | Chen et al. ..................... 709/224 |
| 6,502,222 | B1 | * | 12/2002 | Tetelbaum ..................... 716/114 |
| 2003/0091047 | A1 | * | 5/2003 | Pate et al. ..................... 370/392 |
| 2009/0164173 | A1 |   | 6/2009 | Gupta |

FOREIGN PATENT DOCUMENTS

| EP | 1542398    | 6/2005 |
| JP | 2008178086 | 7/2008 |
| JP | 2010062729 | 3/2010 |
| JP | 2010213101 | 9/2010 |
| WO | 9737310    | 10/1997 |

OTHER PUBLICATIONS

IEEE; IEEE Standard for a Precision Clock Synchronization Protocol for Networked Measurements and Control Systems; IEEE Std 1588-2008; IEEE Instrumentation and Measurements Society, Jul. 24, 2008; (relevant sections: 6.6.3, 65.4).
Frost, T. Symmetricom, Inc.; Deployment Considerations for IEEE1588 in Telecommunication Networks; Symmetricom, Inc.; ITSF 2007.

\* cited by examiner

*Primary Examiner* — Fan Ng
(74) *Attorney, Agent, or Firm* — Patti & Malvone Law Group, LLC

(57) ABSTRACT

It is disclosed a method for updating a cumulative residence time of a synchronization packet received at a node of a packet-switched communication network. The cumulative residence time is equal to a cumulative sum of residence times of the packet at nodes interposed between a further node which has generated the packet and the node. The node comprises an ingress circuit and an egress circuit. The method comprises: receiving the packet at the egress circuit from the ingress circuit; at a timestamp generator of the egress circuit, generating a timestamp; at the egress circuit, calculating a virtual timestamp based on the timestamp and on an estimated variable delay that will be undergone by the packet due to buffering in a buffer located downstream the timestamp generator; and, at the egress circuit, using the virtual timestamp for updating the cumulative residence time, before transmitting the packet to a still further node.

15 Claims, 11 Drawing Sheets

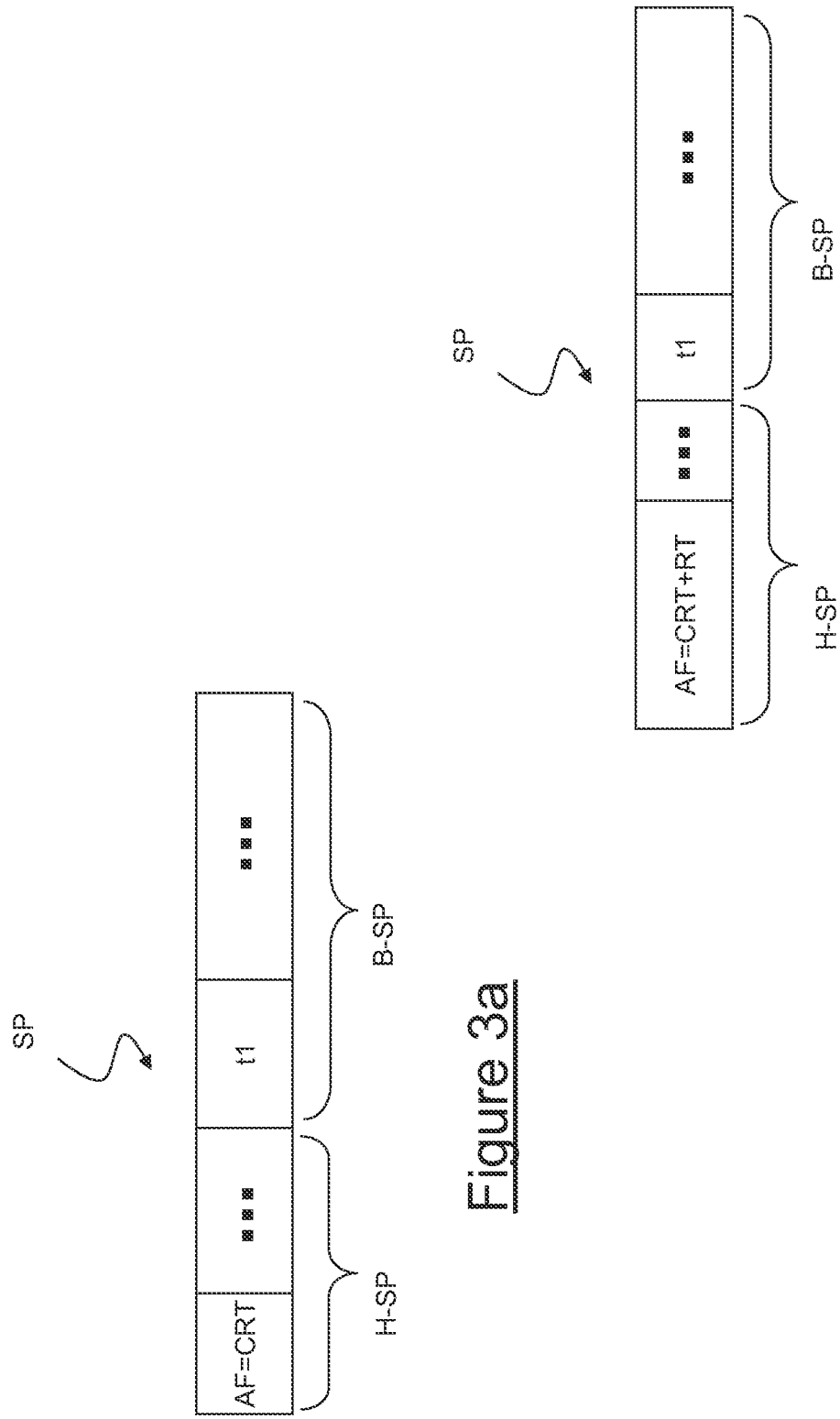

UPDATE OF A CUMULATIVE RESIDENCE TIME OF A PACKET IN A PACKET-SWITCHED COMMUNICATION NETWORK

TECHNICAL FIELD

The present invention generally relates to the field of communication networks. In particular, the present invention relates to the update of the cumulative residence time of a packet transmitted through a packet-switched communication network.

BACKGROUND ART

In a packet-switched communication network, a master node may send to one or more slave nodes synchronization information formatted according to a synchronization protocol. In particular, the master node typically generates synchronization information related to its local clock (frequency and/or time of the day) and sends this information to the slave nodes within synchronization packets. Once the synchronization information is received at the slave nodes, it allows the slave nodes to synchronize the frequency and/or the time of the day of their respective clocks to those of the master node local clock.

Examples of known synchronization protocols are the "Network Time Protocol", NTP, or the IEEE 1588™-2008 protocol, known as "Precision Time Protocol", PTP, and defined in document "IEEE Standard for a Precision Clock Synchronization Protocol for Networked Measurements and Control Systems" by IEEE Instrumentation and Measurements Society, Jul. 24, 2008.

According to IEEE 1588™-2008 protocol (see document cited above, chapter 6, paragraph 6.6.3, pp. 32-34), the master node sends a Sync packet to a slave node and generates a first timestamp t1 indicating the time at which the master node sends the Sync packet. According to a so-called "one-step clock" mechanism, the first timestamp t1 is sent to the slave node within the Sync packet itself. Otherwise, according to a so-called "two-step clock" mechanism, the first timestamp t1 is sent to the slave node within a Follow-Up packet that the master node sends to the slave node after the Sync packet. The slave node in turn receives the Sync packet and generates a second timestamp t2 indicating the time at which the slave node receives the Sync packet. The slave node then sends to the master node a Delay_Req packet and generates a third timestamp t3 indicating the time at which the slave node sends such packet. The master node receives the Delay_Req packet and generates a fourth timestamp t4 indicating the time at which it receives such packet and in turn sends to the slave node the fourth timestamp t4 within a Delay_Resp packet.

At the end of the packet exchange described above, the four timestamps t1, t2, t3, t4 are available at the slave node. The above described packet exchange is typically periodically repeated. By using the four timestamps t1, t2, t3, t4, the slave node is able to synchronize the frequency and the time of the day of its local clock to those of the master node.

The packets transported across a packet-switched network, for instance an Ethernet network, are generally affected by delay variations depending on the network traffic conditions. Indeed, the packet-switched network nodes comprise devices generating variable delays that are not predictable a priori.

For example, at a node of the packet-switched network, each packet is received by an ingress physical interface, and it is then stored in an ingress FIFO buffer of the "Medium Access Control" (MAC) layer of the OSI Model. The packet is then processed within the node. Next, the packet is stored in an egress FIFO buffer of the MAC layer and then it is transmitted by an egress physical interface. The FIFO buffers have no traffic prioritization mechanisms. Hence, the packet is stored for a non predictable time in the FIFO buffers, and then experiences a not predictable residence time within the node.

The above considerations are valid both for data packets and synchronization packets. As far as synchronization packets are concerned, the not predictable delay variations are particularly critical, since they prevent the slave nodes from recovering the synchronization information generated by the master node with an acceptable accuracy, and thus from synchronizing their clock to the local clock of the master node.

The IEEE 1588™-2008 protocol defines a "transparent clock" mechanism (see chapter 6, paragraph 6.5.4 of the document cited above) at each node of the packet-switched network. This mechanism allows measuring the residence time of the synchronization packets (and, in particular, of the Sync and Delay_Req packets) within the node. This way, each slave node is able to recover the synchronization by taking into account the residence times of the synchronization packets within the nodes of the packet-switched network and therefore also the related delay variations. Indeed, upon reception of the synchronization packet, the node generates an ingress timestamp and when the node transmits the packets, it generates an egress timestamp. The residence time of the synchronization packet within the node is then computed as the difference between the egress timestamp and the ingress timestamp. According to the above mentioned one-step clock mechanism, the IEEE 1588™-2008 protocol provides for using the residence time for updating the content of a Correction Field of the synchronization packet itself before the synchronization packet is forwarded by the node. Otherwise, according to the above mentioned two-step clock mechanism, the IEEE 1588™-2008 protocol provides for forwarding the synchronization packet and using its residence time for updating the content of a Correction Field of a subsequent packet (either a Follow_Up packet or a Delay_Resp packet) associated to the synchronization packet.

SUMMARY OF THE INVENTION

The computation of the residence time lies upon the fact that the ingress timestamp is generated exactly when the synchronization packet is received at the ingress physical interface of the node and that the egress timestamp is generated exactly when the synchronization packet is transmitted by the egress physical interface of the node. Therefore, it is required that the ingress and egress physical interfaces of the node are suitable for cooperating with respective timestamp generators.

However, disadvantageously, most of the nodes of current packet-switched networks are not provided with physical interfaces suitable for cooperating with timestamp generators.

In principle, the residence time of a synchronization packet within a node may be computed as the difference between two timestamps which are generated not at the ingress and egress physical interfaces of the node, but at two other devices comprised in the node (namely, located between the ingress physical interface and the egress physical interface).

However, disadvantageously, this computed residence time would not take into account the delays introduced by components (for instance, the ingress and egress FIFO buffers of the MAC layer) possibly interposed between the ingress and egress physical interfaces and the devices at which the timestamps are generated. As mentioned above, these delays are variable in a not predictable way depending on the traffic conditions at the node. Therefore, in this case the computed residence time would not be accurate, since it would be disadvantageously affected by a variable and not predictable error.

Accordingly, the inventors have addressed the problem of providing a method for updating, at a node of a packet-switched communication network, the cumulative residence time of a received packet (in particular, but not exclusively, a synchronization packet) which overcomes the aforesaid drawbacks.

In particular, the inventors have addressed the problem of providing a method for updating, at a node of a packet-switched communication network, the cumulative residence time of a received packet (in particular, but not exclusively, a synchronization packet), wherein the ingress and egress timestamps are not necessarily generated at the ingress and egress physical interfaces, and that at the same time provides an accurate cumulative residence time.

In the present description and in the claims, the expressions "ingress physical timestamp" and "egress physical timestamp" will designate a timestamp generated by a timestamp generator suitable for cooperating with the ingress/egress physical interface of a node (namely, an interface operating at Layer 1 of the OSI Model). Besides, the expression "ingress logical timestamp" and "egress logical timestamp" will designate a timestamp generated by a timestamp generator suitable for cooperating with devices of a node that process packets at a Layer higher than Layer 1 of the OSI Model (for instance, Layer 2).

Moreover, the expression "virtual logical/physical timestamp" will indicate an estimate of a logical/physical timestamp calculated by a computation module.

According to a first aspect, the present invention provides a method for updating a cumulative residence time of a synchronization packet received at a node of a packet-switched communication network, the cumulative residence time being equal to a cumulative sum of residence times of the synchronization packet at nodes of the packet-switched network interposed between a further node which has generated the synchronization packet and the node, the node comprising an ingress circuit configured to receive the synchronization packet and an egress circuit configured to transmit the synchronization packet to a still further node of the packet-switched communication network, the method comprising:

a) receiving the synchronization packet at the egress circuit from the ingress circuit;
b) at an egress timestamp generator of the egress circuit, generating an egress timestamp;
c) at the egress circuit, calculating a virtual timestamp based on the egress timestamp and on an estimated variable delay that will be undergone by the synchronization packet due to buffering in a buffer located downstream the egress timestamp generator; and
d) at the egress circuit, using the virtual timestamp for updating the cumulative residence time, before transmitting the synchronization packet to the still further node.

Preferably, step b) comprises generating an egress logical timestamp.

Preferably, step c) comprises calculating a virtual egress physical timestamp based on the egress logical timestamp and on an estimated variable delay that will be undergone by the synchronization packet due to buffering in an egress buffer comprised in the egress circuit and located downstream the egress timestamp generator.

Preferably, step c) further comprises calculating a virtual ingress logical timestamp based on the virtual egress physical timestamp and on an estimated variable delay that will be undergone by the synchronization packet due to buffering in an ingress buffer comprised in a further ingress circuit of the still further node.

Preferably, step b) comprises generating an egress physical timestamp.

Preferably, step c) comprises calculating a virtual ingress logical timestamp based on the egress physical timestamp and on an estimated variable delay that will be undergone by the synchronization packet due to buffering in an ingress buffer comprised in a further ingress circuit of the still further node.

Preferably, the method further comprises, before step a), generating an ingress timestamp at the ingress circuit, when the ingress circuit receives the synchronization packet.

Preferably, the method further comprises, before step a), writing the ingress timestamp in the synchronization packet at the ingress circuit.

Preferably, step d) comprises reading the ingress timestamp from the synchronization packet, computing a residence time as a difference between the virtual timestamp and the ingress timestamp, and updating the cumulative residence time by adding the residence time to the cumulative residence time.

Preferably, the method further comprises, before step a), subtracting the ingress timestamp from the cumulative residence time at the ingress circuit.

Preferably, step d) comprises adding the virtual timestamp to the cumulative residence time.

Preferably, step d) further comprises writing the updated cumulative residence time in the synchronization packet before transmitting it to the still further node.

According to a second aspect thereof, the present invention provides a computer program product comprising computer-executable instructions for performing, when the program is run on a computer, the steps of the method as set forth above.

According to a third aspect thereof, the present invention provides a node for a packet-switched communication network, the node comprising:

an ingress circuit configured to receive a synchronization packet having associated a cumulative residence time equal to a cumulative sum of residence times of the synchronization packet at nodes of the packet-switched network interposed between a further node which has generated the synchronization packet and the node; and
an egress circuit configured to receive the synchronization packet from the ingress circuit and to transmit it to a still further node of the packet-switched communication network, the egress circuit comprising:
an egress timestamp generator configured to generate an egress timestamp; and
a computation module configured to calculate a virtual timestamp based on the egress timestamp and an estimated variable delay that will be undergone by the synchronization packet due to buffering in a buffer located downstream the egress timestamp generator,
wherein the egress circuit is further configured to use the virtual timestamp for updating the cumulative residence time.

According to a fourth aspect thereof, the present invention provides a packet-switched communication network comprising a node as set forth above.

BRIEF DESCRIPTION OF THE DRAWINGS

Embodiments of the invention will be better understood by reading the following detailed description, given by way of example and not of limitation, to be read with reference to the accompanying drawings, wherein:

FIGS. 3a and 3b schematically show the format of a synchronization packet received by the node of FIG. 1;

DETAILED DESCRIPTION OF PREFERRED EMBODIMENTS OF THE INVENTION

Figure 1:
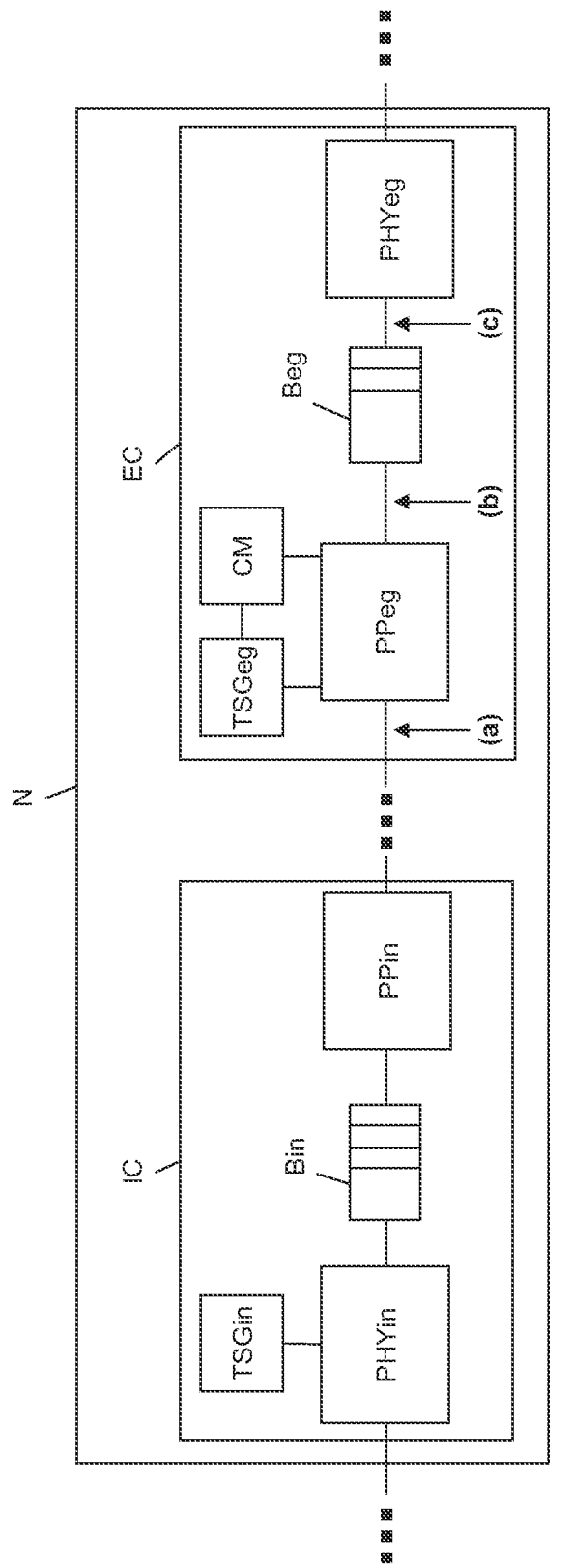
FIG. 1 shows a block diagram of a node of a packet-switched communication network according to a first embodiment of the present invention.

FIG. 1 shows a node N of a packet-switched communication network according to a first embodiment of the present invention. Preferably, the packet-switched communication network is an Ethernet network supporting the above mentioned IEEE 1588™-2008 synchronization protocol.

The node N preferably comprises an ingress circuit IC in turn comprising an ingress physical interface PHYin, an ingress buffer Bin and an ingress packet processor PPin, connected in cascade. The ingress physical interface PHYin is preferably connected to a further node (not shown in the drawings) of the packet-switched communication network through a physical link. The node N can comprise further ingress blocks interposed between the ingress physical interface PHYin and the ingress packet processor PPin, that are not shown in FIG. 1. Further, the node N preferably comprises an egress circuit EC in turn comprising an egress packet processor PPeg, an egress buffer Beg and an egress physical interface PHYeg, connected in cascade. The egress physical interface PHYeg is preferably connected to a still further node (not shown in the drawings) of the packet-switched communication network through a further physical link. The node N can comprise further egress blocks interposed between the egress packet processor PPeg and the egress physical interface PHYeg, that are not shown in FIG. 1.

Preferably, the node N further comprises other hardware and/or software blocks interposed between the ingress circuit IC and the egress circuit EC. These blocks are non shown in the drawings as they are not relevant to the present description.

Preferably, the ingress packet processor PPin and the egress packet processor PPeg are implemented within one or more FPGA ("Field Programmable Gate Array") devices, for instance within the network processor (not shown in FIG. 1) of the node N.

The ingress circuit IC preferably further comprises an ingress timestamp generator TSGin, and the egress circuit EC further preferably comprises an egress timestamp generator TSGeg. According to the first embodiment of the present invention, the ingress timestamp generator TSGin is suitable for cooperating with the ingress physical interface PHYin in order to generate an ingress physical timestamp, while the egress timestamp generator TSGeg is suitable for cooperating with the egress packet processor PPeg in order to generate an egress logical timestamp, as it will be described in greater detail herein after.

Preferably, the egress circuit EC comprises also a computing module CM connected to the egress packet processor PPeg and to the egress timestamp generator TSGeg. Preferably, the computing module CM is implemented within an FPGA device, for example within the network processor (not shown in FIG. 1) of the node N.

Figure 2A:
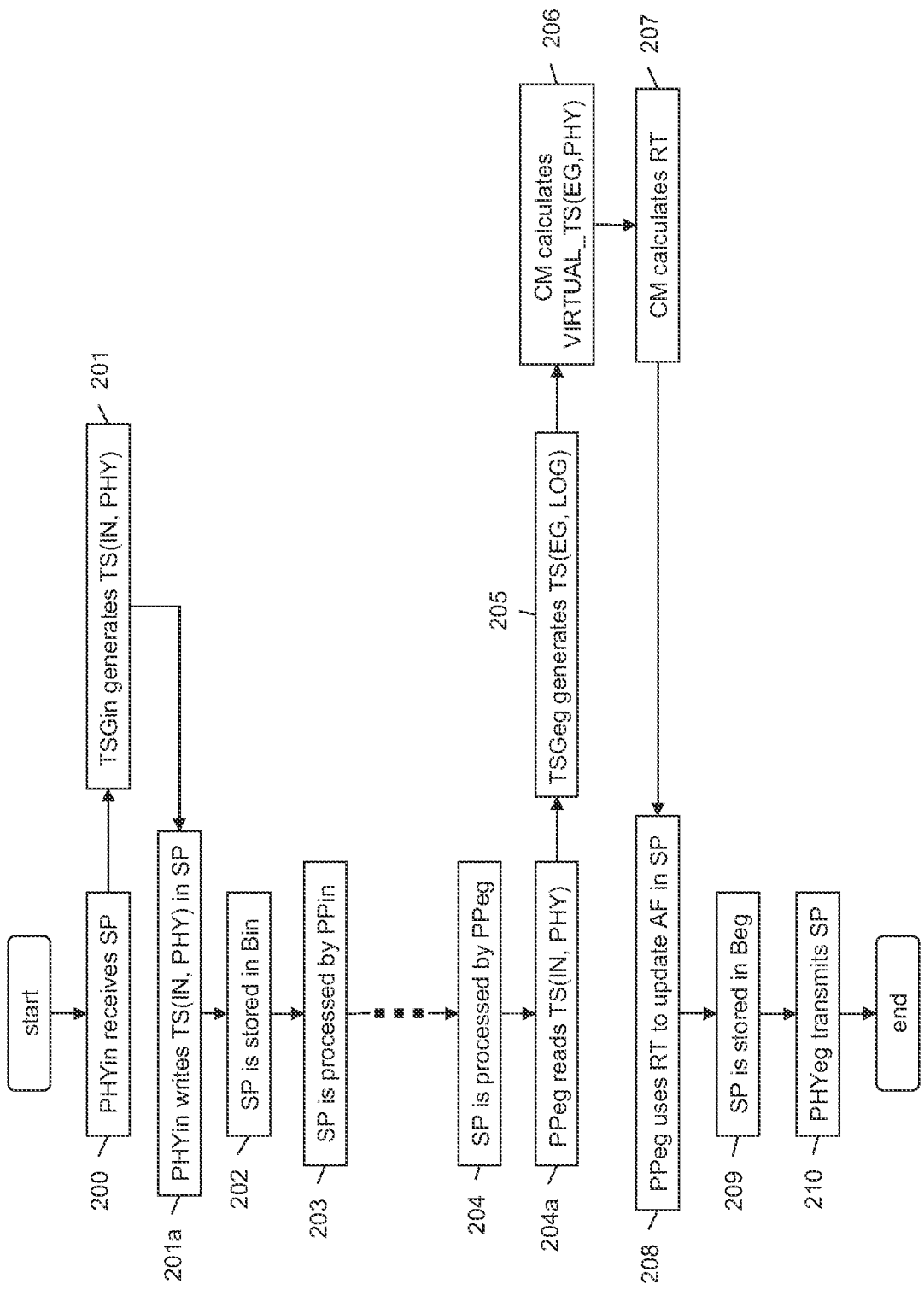
FIGS. 2a and 2b are flow charts describing the operation of the node of FIG. 1, according to a first and second variants of the first embodiment of the present invention.

With reference to FIGS. 2a, 3a and 3b, the operation of the node N according to a first variant of the first embodiment of the present invention will be now described.

It is assumed that the node N receives packets from the above mentioned further node adjacent thereto via its ingress physical interface PHYin. These packets may comprise data packets and/or synchronization packets. Synchronization packets are preferably formatted according to a synchronization protocol, e.g. the IEEE 1588™-2008 protocol.

In particular, at step 200, the ingress physical interface PHYin of the node N receives a synchronization packet SP. The synchronization packet SP is preferably formatted as shown in FIG. 3a. Preferably, the synchronization packet SP comprises a header H-SP and a body B-SP.

Preferably, the body B-SP comprises a timestamp (e.g., the timestamp t1 provided by the IEEE 1588™-2008 protocol) and possibly other information, which are not shown in FIGS. 3a and 3b since they are not relevant to the present description.

Preferably, the header H-SP comprises an adjusting field AF and other fields that are not shown in FIGS. 3a and 3b, as they are not relevant to the present description. Preferably, if the synchronization packet SP is a IEEE 1588™-2008 protocol packet, the adjusting field AF is the "Correction Field". When the synchronization packet SP is received at node N, the adjusting field AF preferably comprises a cumulative residence time CRT equal to the cumulative sum of the residence times of the synchronization packet SP at the nodes of the packet-switched network interposed between the node which has generated the synchronization packet SP and the node N.

As soon as the synchronization packet SP is received by the ingress physical interface PHYin, substantially at the same time the ingress timestamp generator TSGin generates an ingress physical timestamp TS(IN, PHY) (step 201). Then, the ingress physical interface PHYin preferably writes the ingress physical timestamp TS(IN, PHY) in a field of the synchronization packet SP (step 201a). Preferably, the field is a dedicated field (not shown in FIG. 3a) of the header H-SP.

The synchronization packet SP is then stored in the ingress buffer Bin (step 202). Then, preferably, the synchronization packet SP is forwarded to the ingress packet processor PPin which processes it (step 203).

The synchronization packet SP then reaches the egress packet processor PPeg, which processes it (step 204). It should be noticed that that egress packet processor PPeg receives packets not only from the ingress packet processor PPin shown in FIG. 1, but also from other ingress packet processors (not shown in FIG. 1) comprised in the node N. During step 204, the egress packet processor PPeg preferably associates a sequence number SN to the synchronization packet SP, the sequence number SN taking into account the order according to which packets are received at the egress packet processor PPeg. Further, during the processing, the egress packet processor PPeg preferably reads the ingress physical timestamp TS(IN, PHY) from the synchronization packet SP (step 204*a*).

Then, the egress timestamp generator TSGeg preferably generates an egress logical timestamp TS(EG, LOG) (step 205). The computing module CM then preferably computes a virtual egress physical timestamp VIRTUAL_TS(EG, PHY) (step 206), substantially indicating the time at which the synchronization packet SP will be actually transmitted by the egress physical interface PHYeg. The computing module CM then preferably calculates a residence time RT (step 207) as the difference between the virtual egress physical timestamp VIRTUAL_TS(EG, PHY) and the ingress physical timestamp TS(IN, PHY), i.e.:

$$RT = VIRTUAL\_TS(EG,PHY) - TS(IN,PHY). \quad [2]$$

Then, the egress packet processor PPeg preferably uses the residence time RT to update the cumulative residence time CRT comprised in the adjusting field AF of the header H-SP of the synchronization packet SP (step 208) by adding to it the residence time RT, as shown in FIG. 3*b*.

Subsequently, the synchronization packet SP is forwarded by the egress packet processor PPeg to the egress buffer Beg and it is stored therein (step 209). Then, the synchronization packet SP is forwarded to the egress physical interface PHYeg, which transmits it to the above mentioned still further node adjacent to the node N (step 210).

Herein after, the computation of the virtual egress physical timestamp VIRTUAL_TS(EG, PHY) carried out at step 206 by the computing module CM will be described in detail.

Preferably, the computing module CM knows a number of parameters related to the egress buffer Beg. This number of parameters preferably comprises one or more of the following parameters:
- a writing bit rate WR;
- a reading bit rate RR;
- a writing granularity WG, i.e. the number of bit written in parallel in the egress buffer Beg;
- a reading granularity RG, i.e. the number of bits read in parallel from the egress buffer Beg;
- a writing cut-through latency WC, i.e. a constant delay that packets undergo when they are written into the egress buffer Beg;
- a reading cut-through latency RC, i.e. a constant delay that packets undergo when they are read from the egress buffer Beg; and
- an adjustment factor A taking into account the difference between the writing bit rate WR and reading bit rate RR. In particular, in an ideal case where the writing bit rate WR and reading bit rate RR are equal (for instance, they are both locked to a same PLL), A is equal to 1. However, typically, the difference between WR and RR is +/−200 ppm, and therefore A is higher than 1.

During step 206, the computing module CM preferably performs the following sub-steps:

a) it detects the sequence number SN and the number of bits L(SN) of the synchronization packet SP;

b) it computes a time TT(SN) at which the synchronization packet SP will be completely written into the egress buffer Beg, by means of the following equation:

$$TT(SN) = TS(EG,LOG) + WC + WG \times ceil(L(SN)/WG)/WR, \quad [3]$$

where ceil(L(SN)/WG) indicates the smallest integer number not lower than the ratio between L(SN) and WG;

c) it computes a filling level FLb(SN) of the egress buffer Beg at time TT(SN) taking into account only the operation of reading bits already stored into the egress buffer Beg before the synchronization packet SP starts being written therein, and not taking into account the operation of writing the synchronization packet SP, by means of the following equation:

$$FLb(SN) = \max\{0, [FLa(SN-1) - A \times RR \times (TT(SN) - TT(SN-1))]\}. \quad [4]$$

FLa(SN−1) is a filling level of the egress buffer Beg when the packet preceding the synchronization packet SP (i.e. the packet having a sequence number equal to SN−1) is completely written into the egress buffer Beg, taking into account also its reading cut-through latency RC. The notation max{·} indicates that the filling level FLb(SN) is equal to the greatest value amongst those comprised in brace parentheses, while TT(SN−1) is the time at which the packet preceding the synchronization packet SP has been completely written into the egress buffer Beg. Therefore, FLb(SN) is equal to zero when the filling level FLa(SN−1) and the reading bit rate RR are such that in the time interval TT(SN)−TT(SN−1) the egress buffer Beg gets completely empty;

d) it computes the virtual egress physical timestamp VIRTUAL_TS(EG, PHY) by means of the following equation:

$$VIRTUAL\_TS(EG,PHY) = TT(SN) + [RG \times ceil(FLb(SN)/RG)/RR] + RC; \quad [5]$$

and e) it computes a filling level FLa(SN) of the egress buffer Beg when the synchronization packet SP is completely written into the egress buffer Beg by means of the following equation:

$$FLa(SN) = FLb(SN) + RC \times RR + L(SN). \quad [6]$$

The virtual egress physical timestamp VIRTUAL_TS(EG, PHY) computed according to the above equation [5] takes into account only the delay accumulated by the synchronization packet SP when it is stored within the egress buffer Beg. Equation [5] does not take into account other possible delays, for example due to the processing of the synchronization packet SP by other blocks (not shown in FIG. 1) possibly interposed between the egress packet processor PPeg and the egress physical interface PHYeg. If these other possible delays are known, constant and different in the two directions (TX versus RX), they may be compensated as foreseen by IEEE 1588™-2008 protocol.

Steps 200-210 (including sub-steps a)-e) of step 206 described above) are preferably repeated for each synchronization packet received at the node N. In case of data packets, sub-step d) of step 206 and steps 207-208 are preferably omitted.

Advantageously, the method according to the first variant of the first embodiment of the present invention allows computing a residence time of the synchronization packet SP when the egress physical interface PHYeg of the node N is not suitable for cooperating with a timestamp generator. Advantageously, the egress timestamp can be generated upstream of the egress physical interface PHYeg, since the virtual egress physical timestamp VIRTUAL_TS(EG, PHY) takes into account the delay introduced by the components (i.e. the egress buffer Beg) interposed between the egress physical interface PHYeg and the device at which the egress timestamp is generated. The virtual egress physical timestamp VIRTUAL_TS(EG, PHY) is computed for each synchronization packet, and thus its value changes for each synchronization packet, according to the current traffic conditions at node N. This allows updating the adjusting field AF of the synchronization packet SP in an accurate way by taking into account the possible delay variation experienced by the synchronization packet SP, in particular within the egress buffer of the MAC layer, as it will be apparent from the examples described in detail herein after with reference to FIG. 4.

Figure 4:
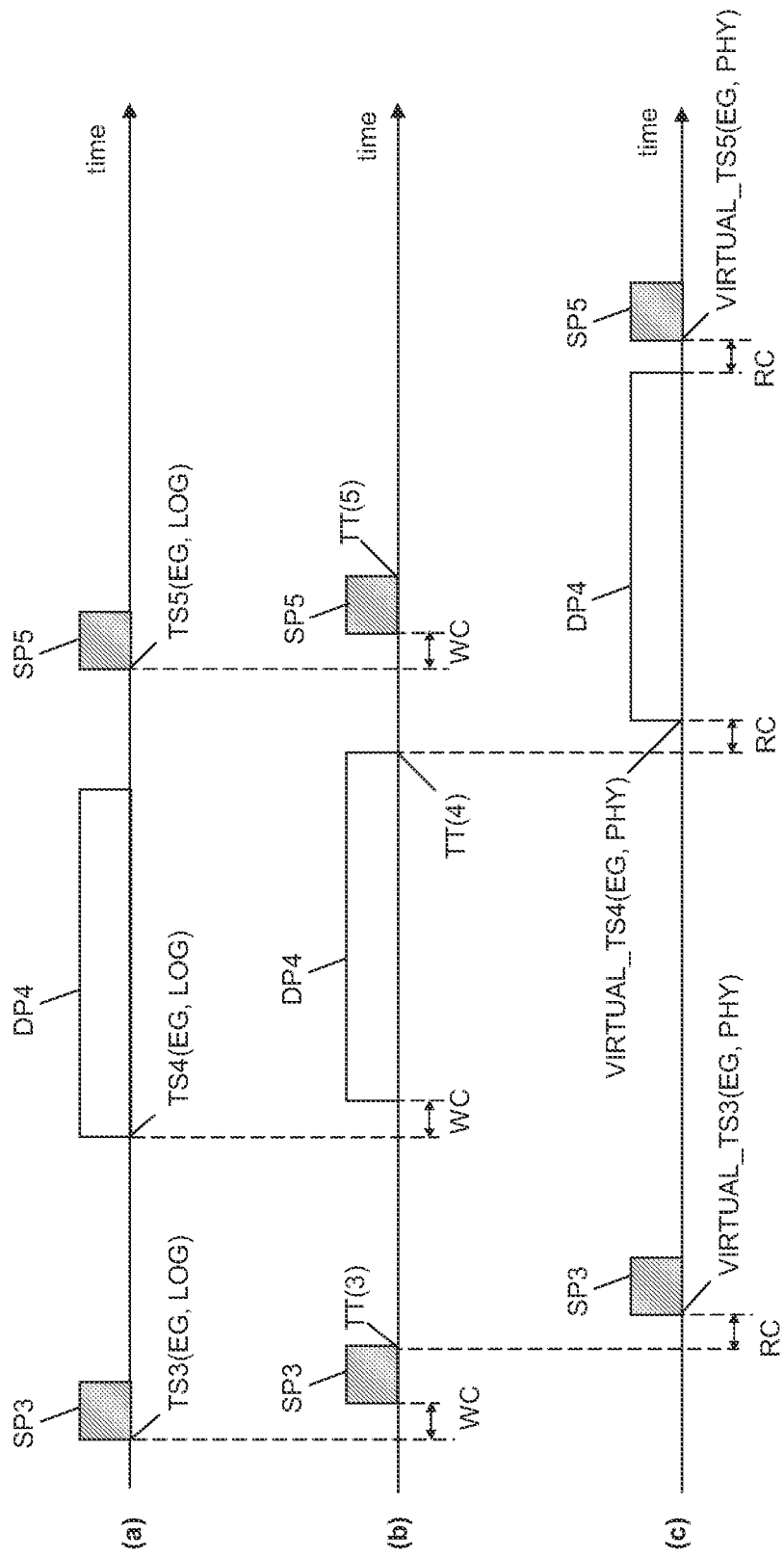
FIG. 4 shows three time diagrams illustrating the operation of the node of FIG. 1.

FIG. 4 shows three exemplary time diagrams illustrating the operation of the node N according to the first variant of the first embodiment of the present invention. The time diagrams of FIG. 4 relate to the input of the egress packet processor PPeg (denoted by (a) in FIG. 1), to the input of the egress buffer Beg (denoted by (b) in FIG. 1), and the output of the egress buffer Beg (denoted by (c) in FIG. 1). By way of example, FIG. 4 shows a first synchronization packet SP3 having a number of bits L(3), followed by a data packet DP4 having a number of bits L(4) and by a second synchronization packet SP5 having a number of bits L(5). The packets SP3, DP4 and SP5 may be received at the node N either through the ingress physical interface PHYin or through other ingress physical interfaces not shown in FIG. 1.

When the packets SP3, DP4 and SP5 are received at the egress packet processor PPeg, the egress packet processor PPeg preferably associates to them respective consecutive sequence numbers, namely 3, 4 and 5.

When the first synchronization packet SP3 is received at the egress packet processor PPeg (step 204), the egress timestamp generator TSGeg generates an egress logical timestamp TS3(EG, LOG) (step 205). Then, during step 206, the computing module CM:
a) detects the sequence number SN=3 and the number of bits L(3) of the first synchronization packet SP3;
b) computes a time TT(3) by means of the above equation [3], i.e.:
   TT(3)=TS3(EG, LOG)+WC+WG×ceil(L(3)/WG)/WR;
c) computes a filling level FLb(3) of the egress buffer Beg at time TT(3) by means of the above equation [4], i.e.:
   FLb(3)=max{0, [FLa(2)−A×RR×(TT(3)−TT(2))]},
   wherein FLa(2) is a filling level of the egress buffer Beg when the packet preceding the first synchronization packet SP3 (i.e. the packet having a sequence number equal to 2) is completely written into the egress buffer Beg. In the following, for sake of simplicity, it is assumed that FLb(3) is equal to zero, i.e. that, when the first synchronization packet SP3 is completely written into the egress buffer Beg, no bits of other packets are present within the egress buffer Beg;
d) computes a virtual egress physical timestamp VIRTUAL_TS3(EG, PHY) by means of the above equation [5], i.e.:
   VIRTUAL_TS3(EG, PHY)=TT(3)+[RG×ceil(FLb(3)/RG)/RR]+RC; and
e) computes a filling level FLa(3) of the egress buffer Beg when the first synchronization packet SP3 is completely written into the egress buffer Beg by means of the above equation [6], i.e.:
   FLa(3)=FLb(3)+RC×RR+L(3).

As assumed before, when the first synchronization packet SP3 is completely written into the egress buffer Beg, the egress buffer Beg is empty. Therefore, the virtual egress physical timestamp VIRTUAL_TS3(EG, PHY) depends only on the writing cut-trough latency WC, on the reading cut-through latency RC and on WG×ceil(L(3)/WG)/WR, which is the time interval required to write the first synchronization packet SP3 into the egress buffer Beg.

At the end of step 206, the computing module CM computes the residence time RT3 (step 207) according to the above equation [2]. The residence time RT3 is then used to update the content of the adjusting field AF of the first synchronization packet SP3 (step 208). The processing of the first synchronization packet SP3 then continues according to steps 209-210 shown in FIG. 2a.

When the data packet DP4 is received at the egress packet processor PPeg (step 204), the egress timestamp generator TSGeg generates an egress logical timestamp TS4(EG, LOG) (step 205). Then, during step 206, the computing module CM:
a) detects the sequence number SN=4 and the number of bits L(4) of the data packet DP4;
b) computes a time TT(4) by means of the above equation [3], i.e.:
   TT(4)=TS4(EG, LOG)+WC+WG×ceil(L(4)/WG)/WR;
c) computes a filling level FLb(4) of the egress buffer Beg at time TT(4) by means of the above equation [4], i.e.:
   FLb(4)=max{0, [FLa(3)−A×RR×(TT(4)−TT(3))]}.
   Sub-step d) is preferably omitted; and
e) computes a filling level FLa(4) of the egress buffer Beg when the data packet DP4 is completely written into the egress buffer Beg by means of the above equation [5], i.e.:
   FLa(4)=FLb(4)+RC×RR+L(4).

At the end of step 206, the computing module CM omits step 207. Also step 208 is preferably omitted. The processing of the data packet DP4 then continues according next steps 209-210 shown in FIG. 2a.

When the second synchronization packet SP5 is received at the egress packet processor PPeg (step 204), the egress timestamp generator TSGeg generates an egress logical timestamp TS5(EG, LOG) (step 205). Then, during step 206, the computing module CM:
a) detects the sequence number SN=5 and the number of bits L(5) of the second synchronization packet SP5;
b) computes a time TT(5) by means of the above equation [3], i.e.:
   TT(5)=TS5(EG, LOG)+WC+WG×ceil(L(5)/WG)/WR;
c) computes a filling level FLb(5) of the egress buffer Beg at time TT(5) by means of the above equation [4], i.e.:
   FLb(5)=max{0, [FLa(4)−A×RR×(TT(5)−TT(4))]};
d) computes a virtual egress physical timestamp VIRTUAL_TS5(EG, PHY) by means of the above equation [5], i.e.:
   VIRTUAL_TS5(EG, PHY)=TT(5)+[RG×ceil(FLb(5)/RG)/RR]+RC; and
e) computes a filling level FLa(5) of the egress buffer Beg when the second synchronization packet SP5 is completely written into the egress buffer Beg by means of the above equation [6], i.e.:
   FLa(5)=FLb(5)+RC×RR+L(5).

In this latter case, the virtual egress physical timestamp VIRTUAL_TS5(EG, PHY) depends on the writing cut-through latency WC, on the reading cut-through latency RC, on WG×ceil(L(5)/WG)/WR, which is the time interval required to write the second synchronization packet SP5 into the egress buffer Beg and also on [RG×ceil(FLb(5)/RG)/RR], which is the time interval required to complete the reading of the whole data packet DP4 from the egress buffer Beg.

At the end of step 206, the computing module CM computes the residence time RT5 (step 207) according to the above equation [2]. The residence time RT5 is then used to update the content of the adjusting field AF of the second synchronization packet SP5 (step 208). The processing of the second synchronization packet SP5 continues then according to next steps 209-210 shown in FIG. 2a.

Figure 2B:
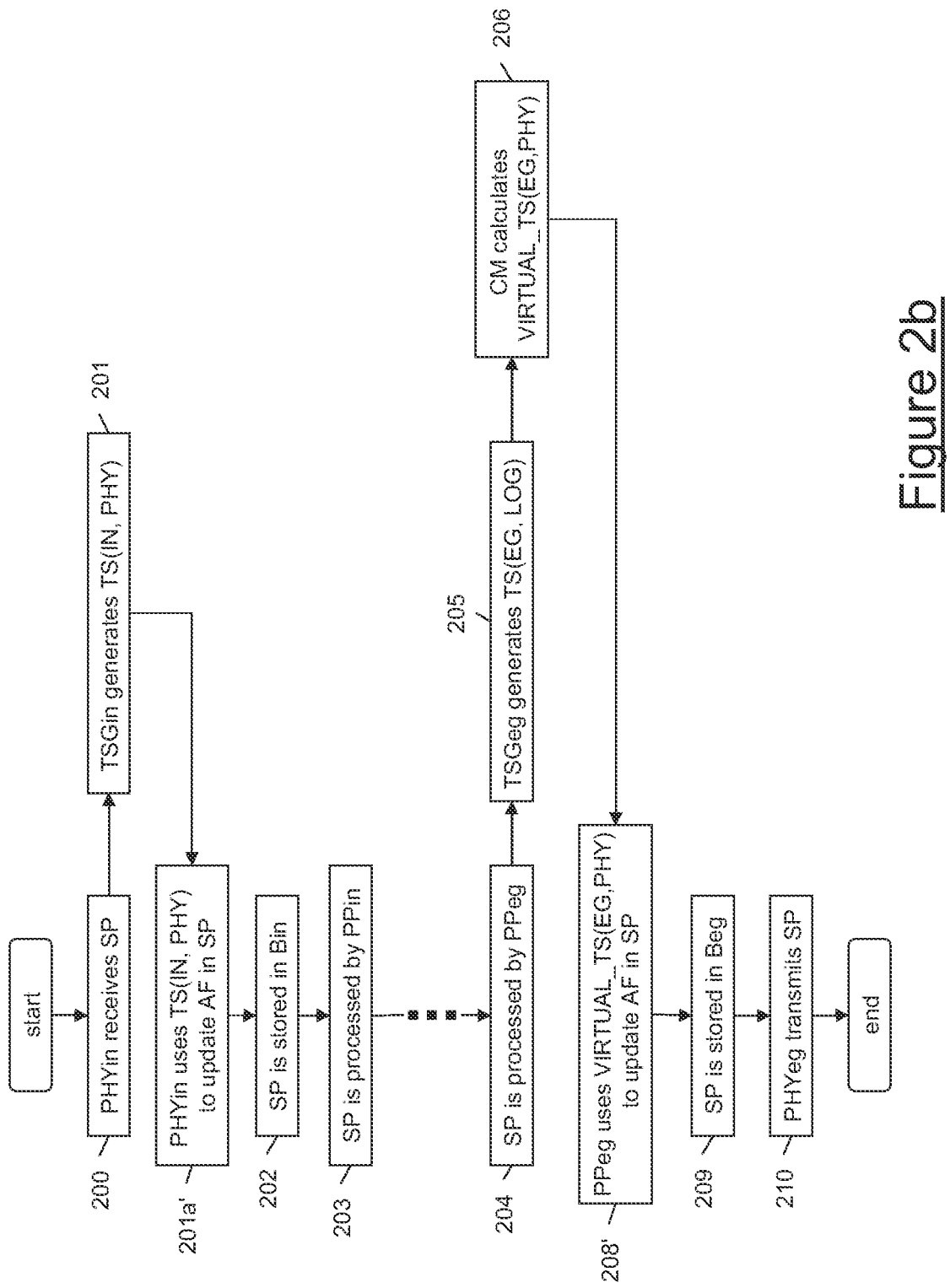

FIG. 2b shows the operation of the node N according to a second variant of the first embodiment of the present invention.

According to this second variant, when at step 201 the ingress timestamp generator TSGin generates the ingress physical timestamp TS(IN, PHY), instead of writing it in a dedicated field of the synchronization packet SP (step 201*a*), the ingress physical interface PHYin preferably uses the ingress physical timestamp TS(IN, PHY) to update the adjusting field AF of the synchronization packet SP (step 201*a'*). In particular, the ingress physical interface PHYin preferably subtracts the ingress physical timestamp TS(IN, PHY) from the cumulative residence time CRT contained in the adjusting field AF.

Then, steps 202 to 206 are performed, similarly to the first variant.

Then, after calculation of the virtual egress physical timestamp VIRTUAL_TS(EG, PHY) has been completed (step 206), instead of calculating the residence time RT (step 207), the virtual egress physical timestamp VIRTUAL_TS(EG, PHY) is directly used by the egress packet processor PPeg to update the adjusting field AF of the synchronization packet SP (step 208'). In particular, the egress packet processor PPeg adds the virtual egress physical timestamp VIRTUAL_TS (EG, PHY) to the cumulative residence time CRT. It should be noticed that the operations performed in steps 201*a'* and 208' of the second variant basically correspond to the operations 207-208 of the first variant. Hence, advantageously, according to this second variant no dedicated field is needed in the synchronization packet SP for forwarding the ingress physical timestamp TS(IN, PHY) to the egress packet processor PPeg.

Figure 5:
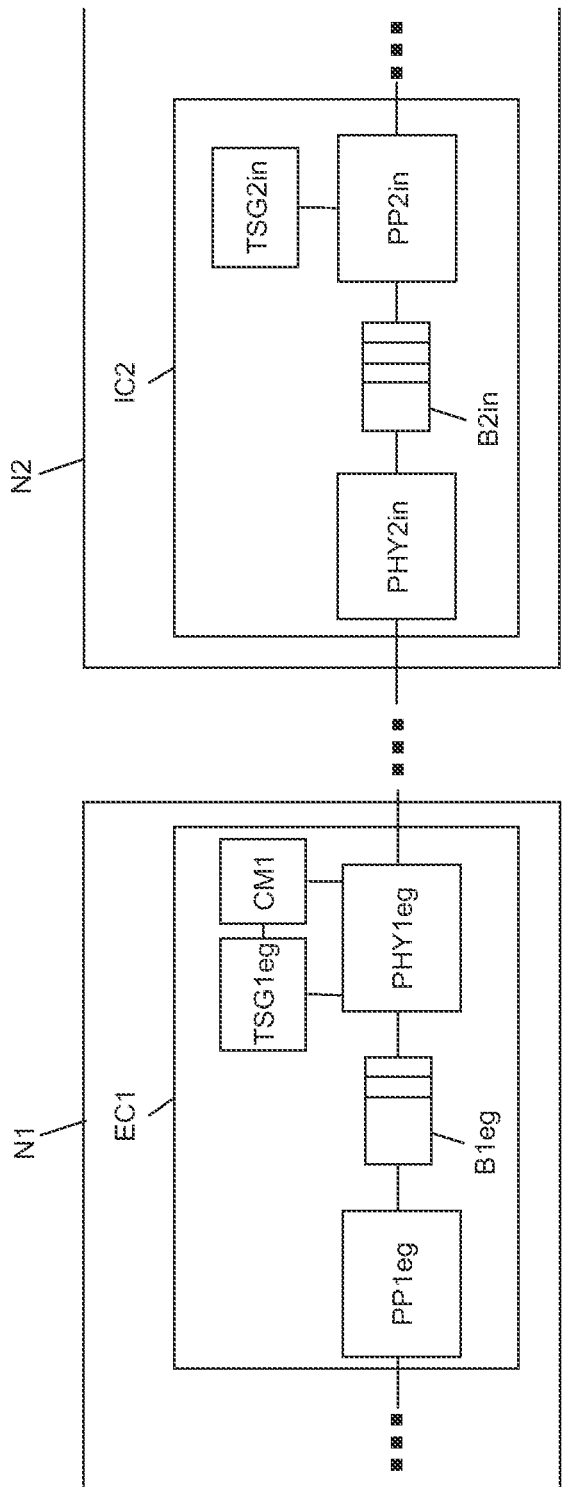
FIG. 5 shows a block diagram of a pair of nodes of a packet-switched communication network according to a second embodiment of the present invention.

FIG. 5 shows a block diagram of a first node N1 and a second node N2 of the packet-switched network, according to a second embodiment of the present invention. The first node N1 and the second node N2 are preferably adjacent. Both the first node N1 and the second node N2 are similar to the node N described above.

In particular, the first node N1 preferably comprises an egress circuit EC1 in turn comprising an egress packet processor PP1eg, an egress buffer B1eg and an egress physical interface PHY1eg, connected in cascade. The egress circuit EC1 preferably further comprises an egress timestamp generator TSG1eg. According to this second embodiment, the egress timestamp generator TSG1eg is suitable for cooperating with the egress physical interface PHY1eg in order to generate an egress physical timestamp, as it will be explained in greater detail herein after. Preferably, the egress circuit EC1 also comprises a computing module CM1 connected to the egress timestamp generator TSG1eg and to the physical egress interface PHY1eg. The other components of the first node N1 are not shown in FIG. 5 as they are not relevant to the present description.

On the other hand, the second node N2 preferably comprises an ingress circuit IC2 in turn comprising an ingress physical interface PHY2in, an ingress buffer B2in and an ingress packet processor PP2in, connected in cascade. The ingress circuit IC2 preferably further comprises an ingress timestamp generator TSG2in. According to this second embodiment of the present invention, the ingress timestamp generator TSG2in is suitable for cooperating with the ingress packet processor PP2in in order to generate an ingress logical timestamp. The other components of the second node N2 are not shown in FIG. 5 as they are not relevant to the present description.

Figure 6A:
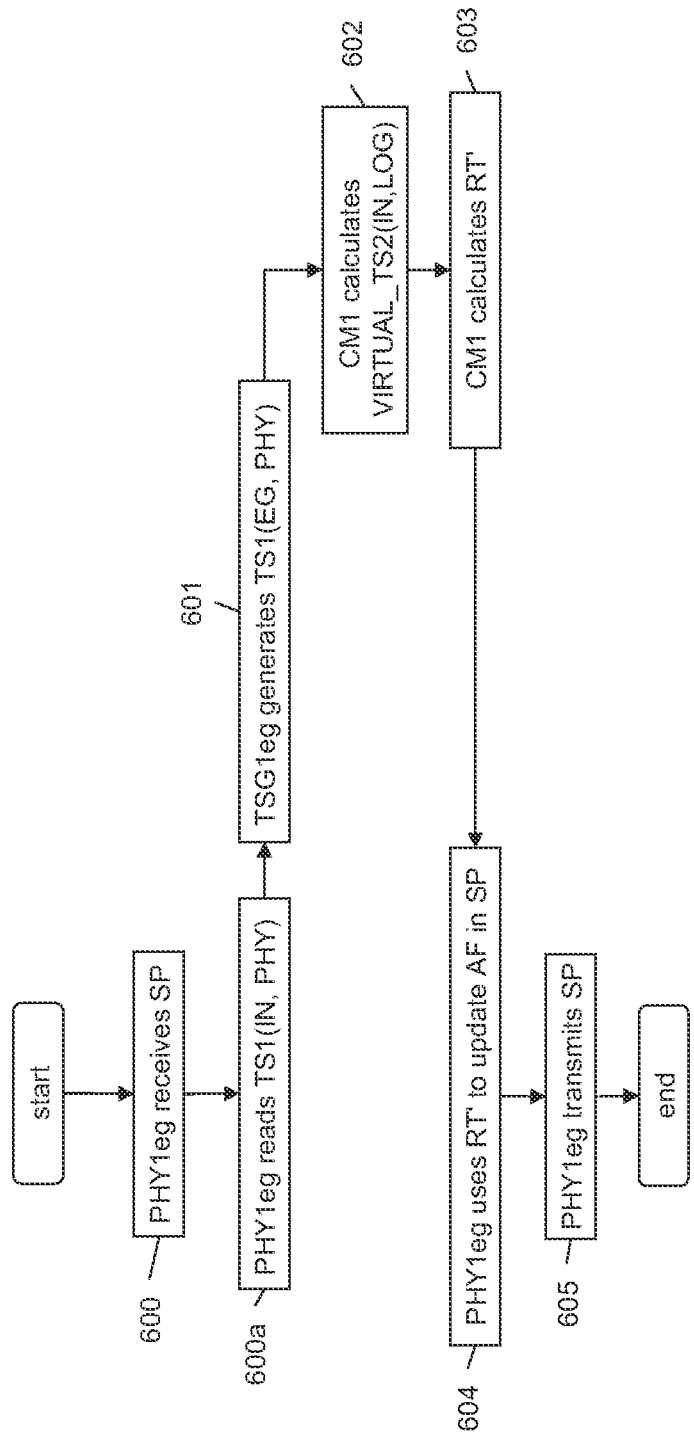
FIGS. 6a and 6b are flow charts describing the operation of the pair of nodes of FIG. 5, according to a first and second variants of the second embodiment of the present invention.

With reference to FIG. 6*a*, the operation of the first node N1 according to a first variant of the second embodiment of the present invention will be now described.

It is assumed that the first node N1 generates packets and receives packets from further nodes adjacent thereto (not shown in FIG. 5). These packets can comprise data packets and/or synchronization packets. Synchronization packets are preferably formatted according to a synchronization protocol, e.g. the IEEE 1588™-2008 protocol.

These packets are forwarded across the various components of the first node N1, till a portion thereof is received by the egress packet processor PP1eg, which processes them and forwards them to the egress buffer B1eg. The egress buffer B1eg preferably stores the packets and forwards them to the egress physical interface PHY1eg.

In particular, the egress physical interface PHY1eg receives from the egress buffer B1eg a synchronization packet SP (step 600). The synchronization packet SP is preferably formatted as shown in FIG. 3*a* and described above. During step 600, the egress physical interface PHY1eg preferably associates a sequence number SN to the synchronization packet SP, the sequence number SN taking into account the order according to which packets are received at the egress physical interface PHY1eg. Further, during step 600, the egress physical interface PHY1eg preferably reads from the synchronization packet SP an ingress timestamp which has been generated at the first node N1 upon reception of the synchronization packet SP (step 600*a*). The ingress timestamp may be either logical or physical. For simplicity, herein after it is assumed that the ingress timestamp is an ingress physical timestamp TS1(IN, PHY).

Then, the egress timestamp generator TSG1eg preferably generates an egress physical timestamp TS1(EG, PHY) (step 601). The computing module CM1 then preferably computes a virtual ingress logical timestamp VIRTUAL_TS2(IN, LOG), substantially indicating the time at which the synchronization packet SP will be received by the ingress packet processor PP2in (step 602) of the second node N2. To this aim, during step 602 the computing module CM1 preferably assumes that a virtual ingress physical timestamp VIRTUAL_TS2(IN, PHY), substantially indicating the time at which the synchronization packet SP is actually received by the ingress physical interface PHY2in, is equal to the egress physical timestamp TS1(EG, PHY) (namely, it assumes that the propagation time of the synchronization packet SP along the physical link connecting the first node N1 and the second node N2 is substantially zero).

The computing module CM1 then preferably calculates a residence time RT' (step 603) as the difference between the virtual ingress logical timestamp VIRTUAL_TS2(IN, LOG) and the ingress physical timestamp TS1(IN, PHY), i.e.:

$$RT'=VIRTUAL\_TS2(IN,LOG)-TS1(IN,PHY). \quad [7]$$

The egress physical interface PHY1eg then preferably updates the cumulative residence time CRT comprised in the adjusting field AF of the header H-SP of the synchronization packet SP (step 604) by adding to it the residence time RT' computed according to equation [7]. Then, the egress physical interface PHYeg transmits the synchronization packet SP to the second node N2 (step 605).

Herein after, the computation of the virtual ingress logical timestamp VIRTUAL_TS2(IN, LOG) carried out during step 602 by the computing module CM1 will be described in detail.

Preferably, the computing module CM1 knows a number of parameters related to the ingress buffer B2in of the second node N2. This number of parameters preferably comprises one or more of the following parameters:
- a writing bit rate WR';
- a reading bit rate RR';
- a writing granularity WG', i.e. the number of bit written in parallel in the ingress buffer B2in;
- a reading granularity RG', i.e. the number of bits read in parallel from the ingress buffer B2in;

a writing cut-through latency WC', i.e. a constant delay that packets undergo then they are written into the ingress buffer B2in;

a reading cut-through latency RC', i.e. a constant delay that packets undergo when they are read from the ingress buffer B2in; and an adjustment factor A' (the same consideration set forth above in connection with the adjustment factor A of the first embodiment also apply to the adjustment factor A', and will therefore not be repeated).

During step 602, the computing module CM1 preferably performs the following sub-steps:

a) it detects the sequence number SN and the number of bits L(SN) of the synchronization packet SP;

b) it computes a time TT(SN) at which the synchronization packet SP will be completely written into the ingress buffer B2in, by means of the following equation $$TT(SN)=TS1(EG,PHY)+WC'+WG'\times ceil(L(SN)/WG')/WR'; \qquad [8]$$

where ceil(L(SN)/WG') indicates the smallest integer number not lower than the ratio between L(SN) and WG';

c) it computes a filling level FLb(SN) of the ingress buffer B2in at time TT(SN) taking into account only the operation of reading bits already stored into the ingress buffer B2in before the synchronization packet SP starts being written, and not taking account the operation of writing the synchronization packet SP, by means of the following equation:

$$FLb(SN)=\max\{0,[FLa(SN-1)-A'\times RR'\times (TT(SN)-TT(SN-1))]\}. \qquad [9]$$

FLa(SN−1) is a filling level of the ingress buffer B2in when the packet preceding the synchronization packet SP (i.e. the packet having a sequence number equal to SN−1) is completely written into the ingress buffer B2in, taking into account also of the reading cut-through latency RC'. The notation max{·} indicates that the filling level FLb(SN) is equal to the greatest value amongst those comprised in brace parentheses, while TT(SN−1) is the time at which the packet preceding the synchronization packet SP has been completely written into the ingress buffer B2in. Therefore, FLb(SN) is equal to zero when the filling level FLa(SN−1) and the reading bit rate RR' are such that in time interval TT(SN)−TT(SN−1) the ingress buffer B2in gets completely empty;

d) it computes the virtual ingress logical timestamp VIRTUAL_TS2(IN, LOG) by means of the following equation:

$$VIRTUAL\_TS2(IN,LOG)=TT(SN)+[RG'\times ceil(FLb(SN)/RG')/RR']+RC'; \qquad [10]$$

and e) it computes a filling level FLa(SN) of the ingress buffer B2in when the synchronization packet SP is completely written into the ingress buffer B2in by means of the following equation:

$$FLa(SN)=FLb(SN)+RC'\times RR'+L(SN). \qquad [11]$$

The virtual ingress logical timestamp VIRTUAL_TS2(IN, LOG) computed according to the above equation [10] takes into account only the delay accumulated by the synchronization packet SP within the ingress buffer B2in. Equation [10] does not take into account other possible delays, for example due to the processing of the synchronization packet SP by other blocks (not shown in FIG. 5) possibly interposed between the ingress physical interface PHY2in an the ingress packet processor PP2in. If these other possible delays are known, constant and different in the two directions (TX versus RX), they may be compensated as foreseen by IEEE 1588™-2008 protocol.

Steps 600-605 (including sub-steps a)-e) of step 602 above described) are preferably repeated for each synchronization packet received by first node N1 and forwarded to second node N2. In case of data packets, sub-step d) of step 602 and steps 603-604 are preferably omitted.

Figure 6B:
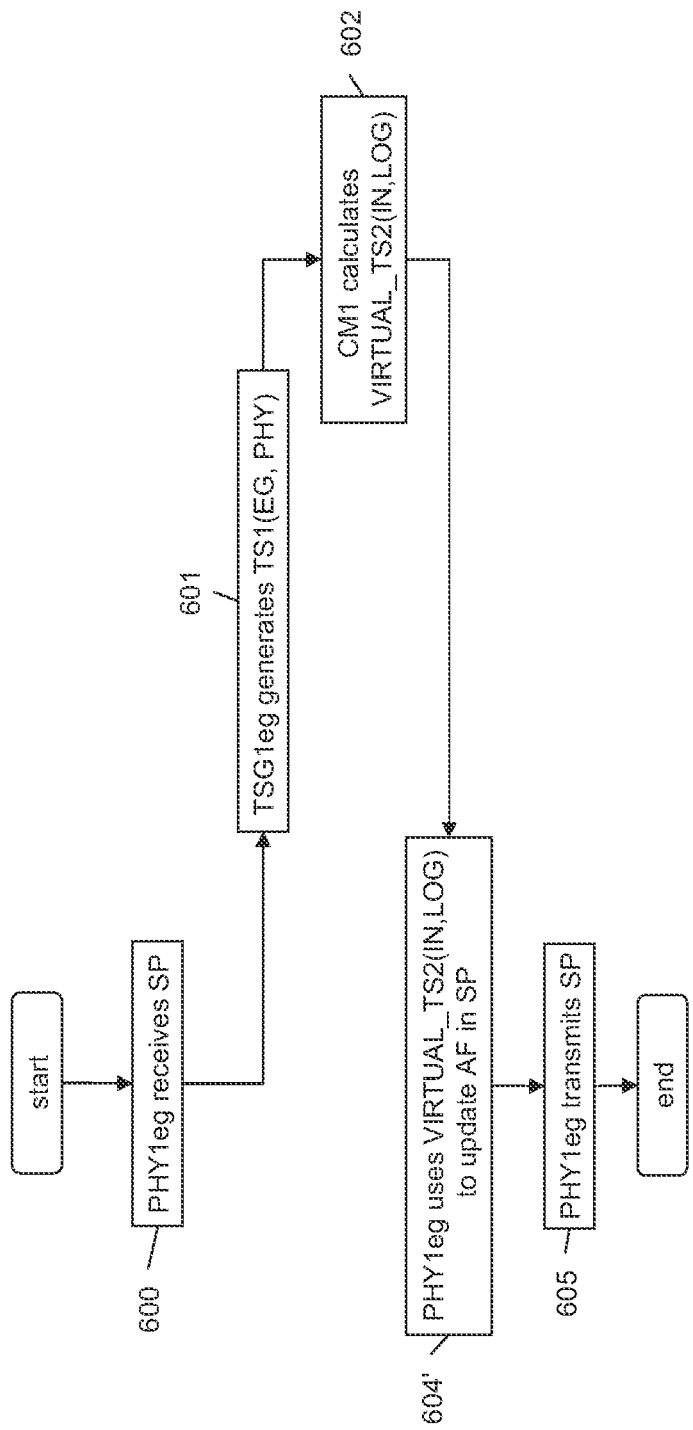

FIG. 6b shows the operation of the node N1 according to a second variant of the second embodiment of the present invention.

According to this second variant, the ingress timestamp which has been generated at first node N1 upon reception of the synchronization packet SP is not comprised in a dedicated field of the synchronization packet SP, but (similarly to the second variant of the first embodiment), has been already subtracted from the cumulative residence time CRT contained in the adjusting field AF of the synchronization packet SP before reception at the egress packet processor PP1eg. Therefore, according to this second variant, step 600a is omitted.

Then, steps 601 and 602 are performed, similarly to the first variant.

Then, after calculation of the virtual ingress logical timestamp VIRTUAL_TS2(IN, LOG) has been completed (step 602), instead of calculating the residence time RT' (step 603), the virtual ingress logical timestamp VIRTUAL_TS2(IN, LOG) is used by the egress physical interface PHY1eg to update the adjusting field AF of the synchronization packet SP (step 604'). In particular, the egress physical interface PHY1eg directly adds the virtual ingress logical timestamp VIRTUAL_TS2(IN, LOG) to the cumulative residence time CRT. It should be noticed that the subtraction performed before reception at the egress packet processor PP1eg and the operation performed in steps 604' of the second variant basically correspond to the operations 603-604 of the first variant. Hence, advantageously, according to this second variant no dedicated field is needed in the synchronization packet SP for forwarding the ingress timestamp to the egress physical interface PHY1eg.

Figure 7:
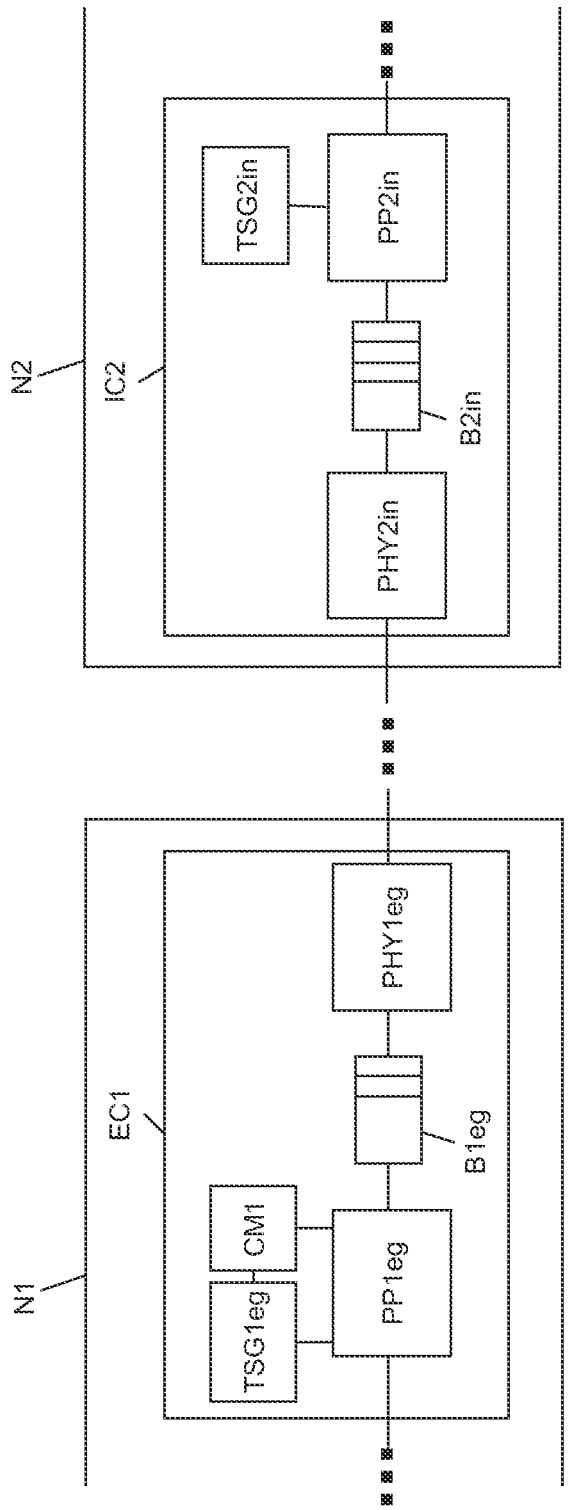
FIG. 7 shows a block diagram of a pair of nodes of a packet-switched communication network according to a third embodiment of the present invention.

FIG. 7 shows a further block diagram of the first node N1 and the second node N2, according to a third embodiment of the present invention.

In particular, according to this third embodiment, the egress timestamp generator TSG1eg is suitable for cooperating with the egress packet processor PP1eg in order to generate an egress logical timestamp, as it will be described in greater detail herein after.

Figure 8A:
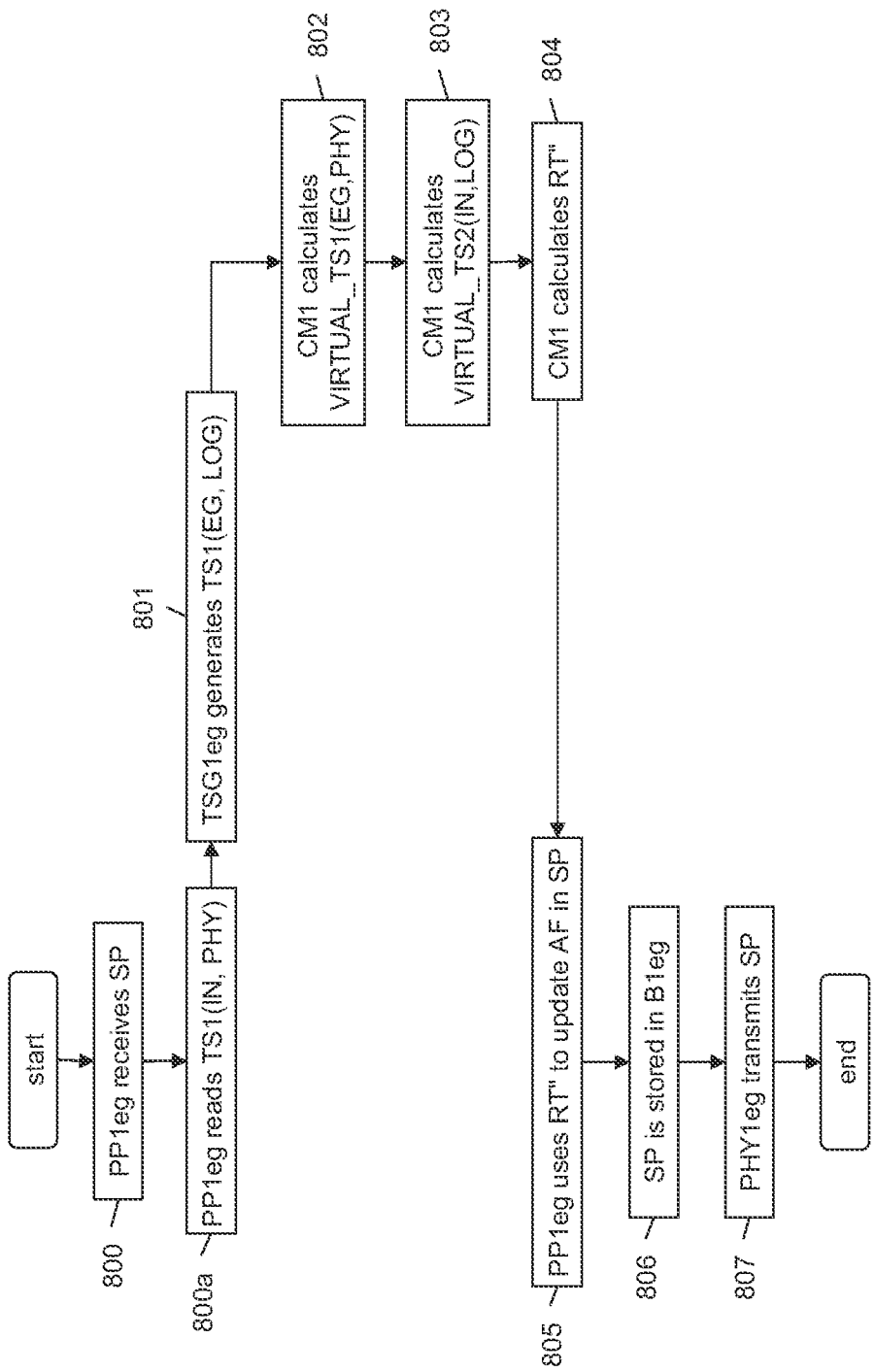
FIGS. 8a and 8b are flow charts describing the operation of the pair of nodes of FIG. 7, according to a first and second variants of the third embodiment of the present invention.

With reference to FIG. 8a, the operation of the first node N1 according to a first variant of the third embodiment of the present invention will now be described.

It is assumed that the first node N1 generates packets and receives packets from further nodes adjacent thereto (not shown in FIG. 7). These packets can comprise data packets and/or synchronization packets. Synchronization packets are preferably formatted according to a synchronization protocol, e.g. the IEEE 1588™-2008 protocol.

These packets are forwarded across the various components of the first node N1, till a portion thereof is received by the egress packet processor PP1eg.

In particular, the egress packet processor PP1eg receives a synchronization packet SP (step 800). The synchronization packet SP is preferably formatted as shown in FIG. 3a and described above. During step 800, the egress packet processor PP1eg preferably associates a sequence number SN to the synchronization packet SP, the sequence number SN taking into account the order according to which packets are received at the egress packet processor PP1eg. Further, during step 800, the egress packet processor PP1eg preferably reads from the synchronization packet SP an ingress timestamp which has been generated at the first node N1 upon reception of the synchronization packet SP (step 800a). The ingress timestamp may be either logical or physical. For simplicity, herein after it is assumed that the ingress timestamp is an ingress physical timestamp TS1(IN, PHY).

Then, the egress timestamp generator TSG1eg preferably generates an egress logical timestamp TS1(EG, LOG) (step 801). Then, the computing module CM1 computes a virtual egress physical timestamp VIRTUAL_TS1(EG, PHY) substantially indicating the time at which the synchronization packet SP will be actually transmitted by the egress physical interface PHY1eg (step 802). Moreover, the computing module CM1 preferably computes a virtual ingress logical timestamp VIRTUAL_TS2(IN, LOG) substantially indicating the time at which the synchronization packet SP will be received by the ingress packet processor PP2in (step 803). To this aim, in step 803, the computing module CM1 preferably assumes that a virtual ingress physical timestamp VIRTUAL_TS2(IN, PHY), substantially indicating the time at which the synchronization packet SP will be actually received by the ingress physical interface PHY2in, is equal to the virtual egress physical timestamp VIRTUAL_TS1(EG, PHY) (namely, it assumes that the propagation time of the synchronization packet SP along the physical link connecting the first node N1 and the second node N2 is substantially zero).

The computing module CM1 then computes a residence time RT" (step 804) as the difference between the virtual ingress logical timestamp VIRTUAL_TS2(IN, LOG) and the ingress physical timestamp TS1(IN, PHY), i.e.:

$$RT"=VIRTUAL\_TS2(IN,LOG)-TS1(IN,PHY). \quad [12]$$

The egress packet processor PP1eg then preferably uses the residence time RT" computed according to equation [12] to update the cumulative residence time CRT comprised in the adjusting field AF of the header H-SP of the synchronization packet SP (step 805). Subsequently, the synchronization packet SP is forwarded by the egress packet processor PP1eg to the egress buffer B1eg and it is stored therein (step 806). Then, the synchronization packet SP is forwarded to the egress physical interface PHY1eg, which transmits it to the second node N2 (step 807).

The computation of the virtual egress physical timestamp VIRTUAL_TS1(EG, PHY) carried out during step 802 by the computing module CM1 is substantially the same as the computation of the virtual egress physical timestamp VIRTUAL_TS(EG, PHY) carried out at step 206 according to the first embodiment of the present invention, using the parameters relating to the egress buffer B1eg of the first node N1. Besides, the computation of the virtual ingress logical timestamp VIRTUAL_TS2(IN, LOG) carried out during step 803 by the computing module CM1 is substantially the same as the computation of the virtual ingress logical timestamp VIRTUAL_TS(IN, LOG) carried out during step 602 according to the second embodiment of the present invention, using the parameters relating to the ingress buffer B2in of the second node N2. Therefore, a detailed description of the computation of the virtual egress physical timestamp VIRTUAL_TS1(EG, PHY) and the virtual ingress logical timestamp VIRTUAL_TS2(IN, LOG) will not be repeated.

Figure 8B:
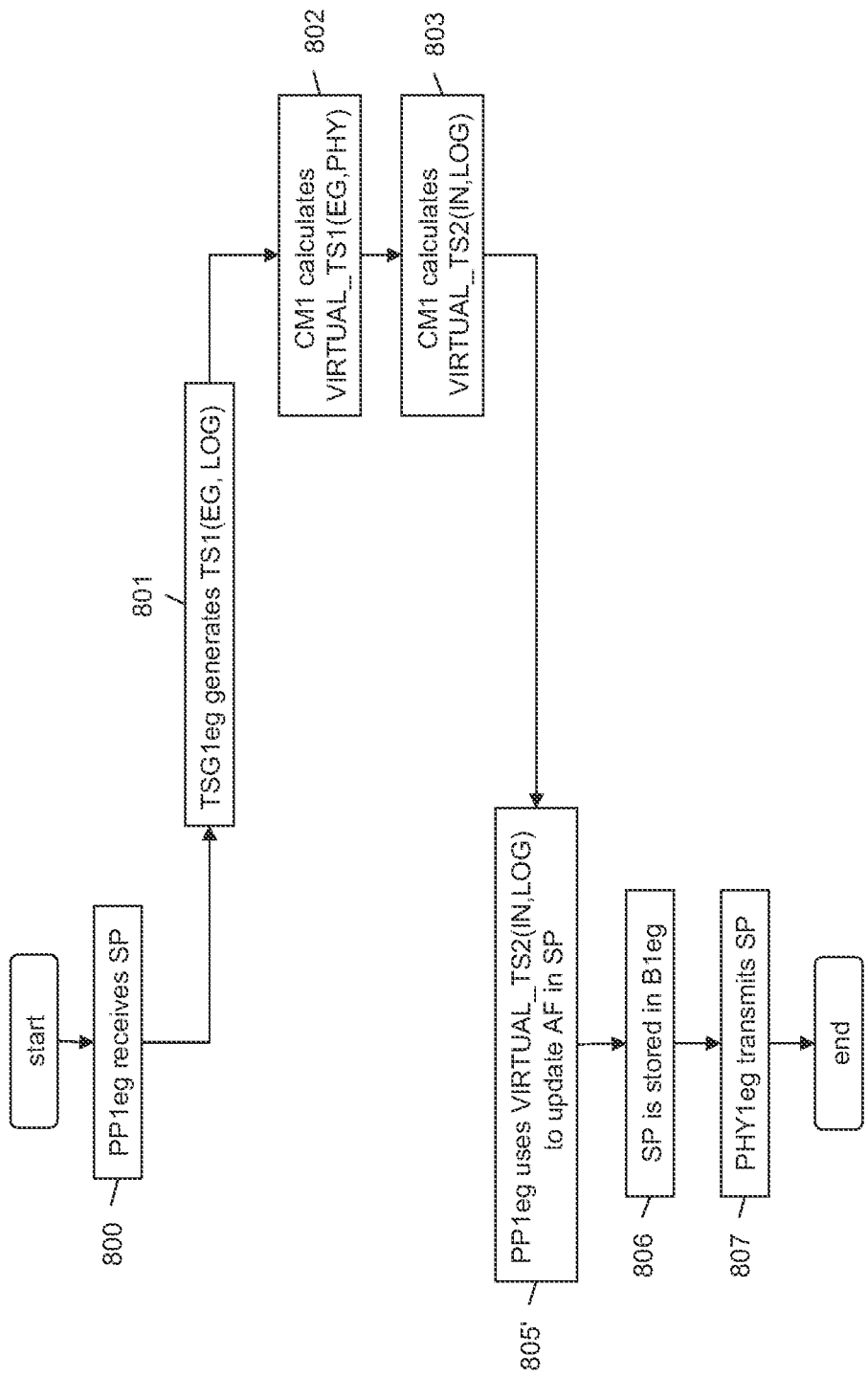

FIG. 8b shows the operation of the node N1 according to a second variant of the third embodiment of the present invention.

According to this second variant, the ingress timestamp which has been generated at first node N1 upon reception of the synchronization packet SP is not comprised in a dedicated field of the synchronization packet SP, but (similarly to the second variant of the first and second embodiments), has been already subtracted from the cumulative residence time CRT contained in the adjusting field AF of the synchronization packet SP before reception at the egress packet processor PP1eg. Therefore, according to this second variant, step 800a is omitted.

Then, steps 801-803 are performed, similarly to the first variant.

Then, after calculation of the virtual ingress logical timestamp VIRTUAL_TS2(IN, LOG) has been completed (step 803), instead of calculating the residence time RT" (step 804), the virtual ingress logical timestamp VIRTUAL_TS2(IN, LOG) is used by the egress packet processor PP1eg to update the adjusting field AF of the synchronization packet SP (step 805'). In particular, the egress packet processor PP1eg directly adds the virtual ingress logical timestamp VIRTUAL_TS2(IN, LOG) to the cumulative residence time CRT. It should be noticed that the subtraction performed before reception at the egress packet processor PP1eg and the operation performed in steps 805' of the second variant basically correspond to the operations 804-805 of the first variant. Hence, advantageously, according to this second variant no dedicated field is needed in the synchronization packet SP for forwarding the ingress timestamp to the egress packet processor PP1eg.

Thus, while in the first embodiment (i.e. when a node is not able to generate an egress physical timestamp) the node itself is able to calculate the residence time of the synchronization packet SP taking into account the delay introduced by the egress buffer Beg, according to the second and third embodiments (i.e. when the node is not able to generate an ingress physical timestamp), the node itself is not able to carry out the calculation for taking into account the delay introduced by its ingress buffer B2in. This is due to the fact that the node can not know which was the filling level of its ingress buffer B2in when the synchronization packet SP has been received. Therefore, the node is not able to compute the delay introduced by its ingress buffer B2in.

According to these second and third embodiments, the upstream node (i.e. the node from which the packets are received) performs the computation of the residence time and uses it in order to update the cumulative residence time of the synchronization packet taking into account also the delay introduced by the ingress buffer B2in of the downstream node. This is possible since the upstream node knows in advance the traffic conditions of the downstream node, and it can then foresee the delay introduced by the ingress buffer of the downstream node.

If a node is able to generate neither an ingress physical timestamp nor an egress physical timestamp, the first and second/third embodiments described above may be combined.

In particular, the delay introduced by the ingress buffer of the node may be computed in the upstream node and it is added to the residence time of the synchronization packet within the upstream node (according to either the second or the third embodiment). On the other hand, the delay introduced by the egress buffer is computed at the node itself, and it is added to the residence time of the synchronization packet at the node itself. Also in this case, it is then advantageously possible to update the cumulative residence time CRT comprised in the adjusting field AF of the synchronization packet, in order to take into account the delays introduced by the ingress and egress buffers of the node.

In the above description of the first, second and third embodiments of the present invention, it has been assumed that the node N, N1 implements the above mentioned one-step clock mechanism, i.e. the node N, N1 is capable of computing the residence time of the synchronization packet SP and using it for updating the adjusting field of the synchronization packet SP itself, before forwarding it to further nodes.

However, according to other advantageous embodiments, the node N, N1 may implement the above mentioned two-step clock mechanism. According to these advantageous embodiments, the node N, N1 calculates the residence time (or the virtual timestamps) of the synchronization packet SP as described above, and then uses the residence time (or the virtual timestamps) for updating the adjusting field of a subsequent packet (possibly generated by the node N, N1).

The functions of the various elements shown in the nodes of FIGS. 1, 5 and 7 may be provided through the use of dedicated hardware, as well as hardware capable of executing software in association with appropriate software. When provided by a processor (namely, the packets processors), the functions may be provided by a single dedicated processor, by a single shared processor or by a plurality of individual processors, some of which may be shared. Moreover, the explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM) and non volatile storage. Other hardware, conventional and/or custom, may also be included.

The invention claimed is:

1. A method for updating a cumulative residence time of a synchronization packet received at a node of a packet-switched communication network, said method comprising:
   a) receiving said synchronization packet an ingress circuit of said node having associated said cumulative residence time equal to a cumulative sum of residence times of said synchronization packet at nodes of said packet-switched network interposed between a further node which has generated said synchronization packet and said node;
   b) receiving said synchronization packet at said egress circuit from said ingress circuit and to transmit it to a still further node of said packet-switched communication network;
   c) at an egress timestamp generator of said egress circuit, generating an egress timestamp;
   d) at said egress circuit, calculating a virtual timestamp based on said egress timestamp and on an estimated variable delay that will be undergone by said synchronization packet due to buffering in a buffer located downstream said egress timestamp generator; and
   e) at said egress circuit, using said virtual timestamp for updating said cumulative residence time, before transmitting said synchronization packet to said still further node.

2. The method according to claim 1, wherein said step c) further comprises generating an egress logical timestamp.

3. The method according to claim 2, wherein said step d) further comprises calculating a virtual egress physical timestamp based on said egress logical timestamp and on an estimated variable delay that will be undergone by said synchronization packet due to buffering in an egress buffer comprised in said egress circuit and located downstream said egress timestamp generator.

4. The method according to claim 3, wherein said step d) further comprises calculating a virtual ingress logical timestamp based on said virtual egress physical timestamp and on an estimated variable delay that will be undergone by said synchronization packet due to buffering in an ingress buffer comprised in a further ingress circuit of said still further node.

5. The method according to claim 1, wherein said step c) further comprises generating an egress physical timestamp.

6. The method according to claim 5, wherein said step d) further comprises calculating a virtual ingress logical timestamp based on said egress physical timestamp and on an estimated variable delay that will be undergone by said synchronization packet due to buffering in an ingress buffer comprised in a further ingress circuit of said still further node.

7. The method according claim 6, wherein it further comprises, before said step a), generating an ingress timestamp at said ingress circuit, when said ingress circuit receives said synchronization packet.

8. The method according to claim 7, wherein it further comprises, before said step a), writing said ingress timestamp in said synchronization packet at said ingress circuit.

9. The method according to claim 8, wherein said step e) further comprises reading said ingress timestamp from said synchronization packet, computing a residence time as a difference between said virtual timestamp and said ingress timestamp, and updating said cumulative residence time by adding said residence time to said cumulative residence time.

10. The method according to claim 7, wherein it further comprises, before said step a), subtracting said ingress timestamp from said cumulative residence time at said ingress circuit.

11. The method according to claim 10, wherein said step e) further comprises adding said virtual timestamp to said cumulative residence time.

12. The method according to claim 11, wherein said step e) further comprises writing said updated cumulative residence time in said synchronization packet before transmitting it to said still further node.

13. A computer program product comprising a non-transitory computer readable storage medium having computer-executable instructions to enable a processor to perform a method of updating a cumulative residence time of a synchronization packet received at a node of a packet-switched communication network, said cumulative residence time being equal to a cumulative sum of residence times of said synchronization packet at nodes of said packet-switched network interposed between a further node which has generated said synchronization packet and said node, said node comprising an ingress circuit configured to receive said synchronization packet and an egress circuit configured to transmit said synchronization packet to a still further node of said packet-switched communication network, the method comprising:
   a) receiving said synchronization packet at said egress circuit from said ingress circuit;
   b) at an egress timestamp generator of said egress circuit, generating an egress timestamp;
   c) at said egress circuit, calculating a virtual timestamp based on said egress timestamp and on an estimated variable delay that will be undergone by said synchronization packet due to buffering in a located downstream said egress timestamp generator; and
   at said egress circuit, using said virtual timestamp for updating said cumulative residence time, before transmitting said synchronization packet to said still further node.

14. A node for a packet-switched communication network, said comprising:

an ingress circuit configured to receive a synchronization packet having associated a cumulative residence time equal to a cumulative sum of residence times of said synchronization packet at nodes of said packet-switched network interposed between a further node which has generated said synchronization packet and said node; and an egress circuit configured to receive said synchronization packet from said ingress circuit and to transmit it to a still further node of said packet-switched communication network, said egress circuit comprising:

an egress timestamp generator configured to generate an egress timestamp; and a computation module configured to calculate a virtual timestamp based on said egress timestamp and an estimated variable delay that will be undergone by said synchronization packet due to buffering in a buffer located downstream said egress timestamp generator, wherein said egress circuit is further configured to use said virtual timestamp for updating said cumulative residence time.

15. A packet-switched communication network comprising a node, said node comprising:

an ingress circuit configured to receive a synchronization packet having associated a cumulative residence time equal to a cumulative sum of residence times of said synchronization packet at nodes of said packet-switched network interposed between a further node which has generated said synchronization packet and said node; and an egress circuit configured to receive said synchronization packet from said ingress circuit and to transmit it to a still further node of said packet-switched communication network, said egress circuit comprising:

an egress timestamp generator configured to generate an egress timestamp; and a computation module configured to calculate a virtual timestamp based on said egress timestamp and an estimated variable delay that will be undergone by said synchronization packet due to buffering in a buffer located downstream said egress timestamp generator, wherein said egress circuit is further configured to use said virtual timestamp for updating said cumulative residence time.

* * * * *